United States Patent [19]

Katayama et al.

[11] Patent Number: 5,086,487
[45] Date of Patent: Feb. 4, 1992

[54] METHOD AND APPARATUS FOR IMAGE ENCODING IN WHICH REFERENCE PIXELS FOR PREDICTIVE ENCODING CAN BE SELECTED BASED ON IMAGE SIZE

[75] Inventors: Akihiro Katayama, Kawasaki; Tadashi Yoshida, Ichikawa; Yasuji Hirabayashi, Tokyo; Mitsuru Maeda, Yokohama, all of Japan

[73] Assignee: Canon Kabushiki Kaisha, Tokyo, Japan

[21] Appl. No.: 438,082

[22] Filed: Nov. 2, 1989

[30] Foreign Application Priority Data

Nov. 24, 1988 [JP] Japan .................................. 63-297512
Dec. 8, 1988 [JP] Japan .................................. 63-311694

[51] Int. Cl.⁵ .............................................. G06K 9/00
[52] U.S. Cl. .................................... 382/56; 382/27; 382/39; 382/47; 358/261.2; 358/426
[58] Field of Search .................... 382/47, 56, 39, 27; 358/426, 261.2

[56] References Cited

U.S. PATENT DOCUMENTS

| | | | |
|---|---|---|---|
| 4,764,975 | 8/1988 | Inoue | 382/47 |
| 4,819,190 | 4/1989 | Hinman et al. | 364/521 |
| 4,870,695 | 9/1989 | Gonzales et al. | 382/56 |
| 4,876,610 | 10/1989 | Ohsawa et al. | 358/443 |
| 4,878,125 | 10/1989 | Katayama et al. | 358/443 |

OTHER PUBLICATIONS

"Compression of Black-White Images With Arithmetic Coding", IEEE Transactions on Communication, vol. COM-29, No. 6, June 1981, Langdon et al., pp. 860-866.

Primary Examiner—David K. Moore
Assistant Examiner—Daniel Santos
Attorney, Agent, or Firm—Fitzpatrick, Cella, Harper & Scinto

[57] ABSTRACT

There is disclosed an image encoding system in which a size of an image to be encoded is inputted, reference pixel positions or the number of reference pixels are determined in accordance with an input image size, and a noticed pixel is encoded by using reference pixels of the determined pixel positions or the determined member.

25 Claims, 12 Drawing Sheets

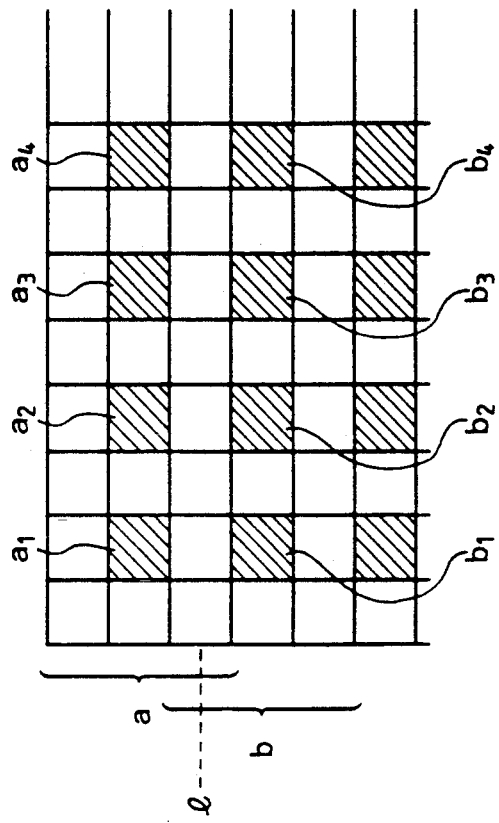
FIG. 3
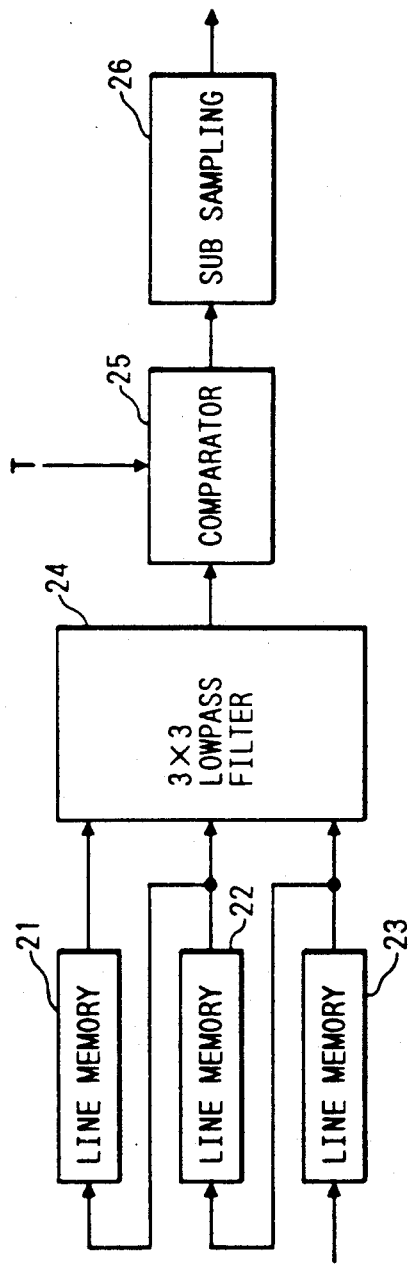
FIG. 5
FIG. 4

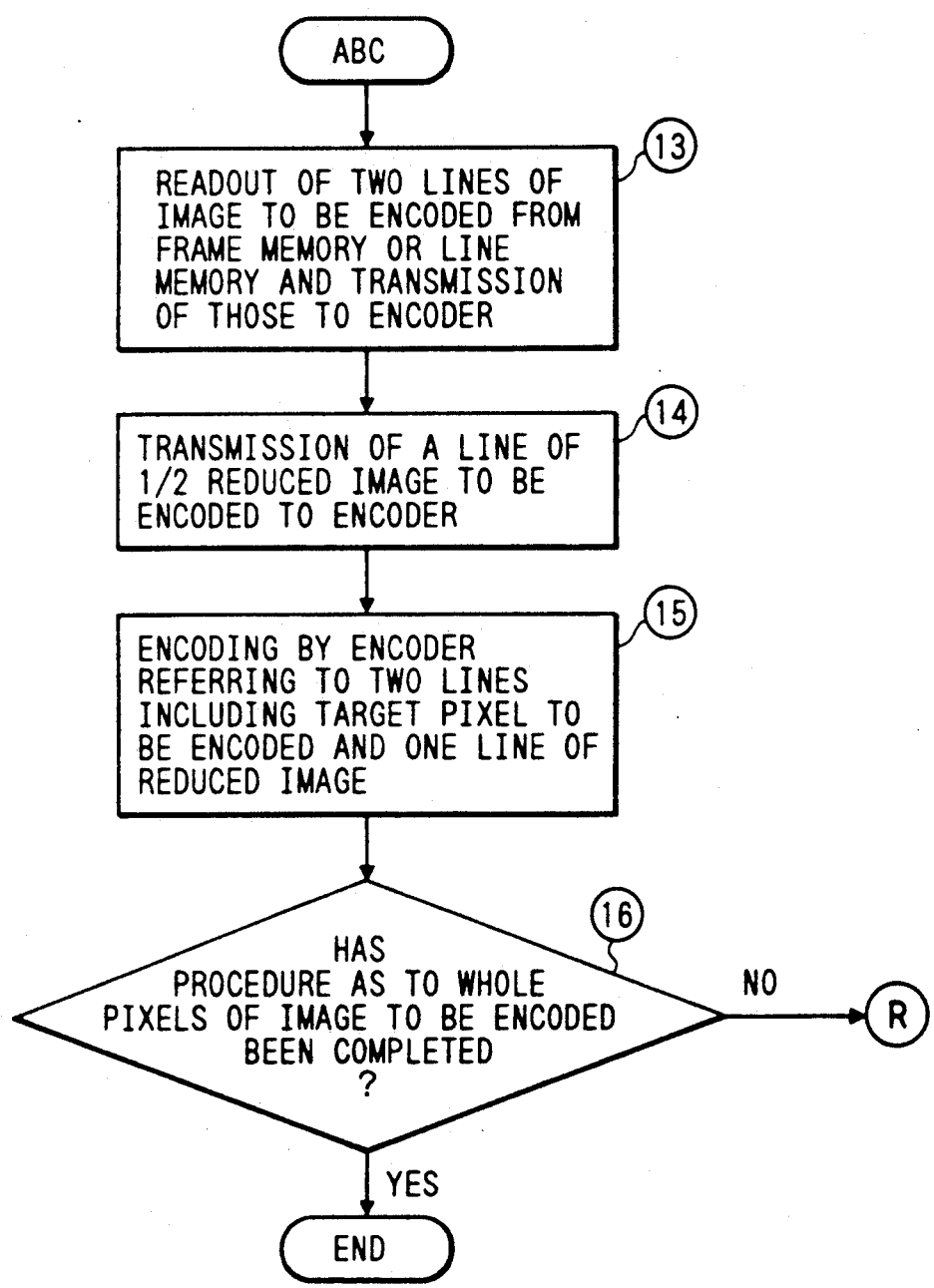

| 5 | 2 | 3 | 4 |
|---|---|---|---|
| 1 | * |   |   |

\* NOTICED PIXEL TO BE ENCODED

|    |    | 14 |    |    |    |
|----|----|----|----|----|----|
| 12 | 6  | 9  | 7  | 11 |    |
| 16 | 5  | 4  | 2  | 3  | 10 | 15 |
| 13 | 8  | 1  | *  |    |    |

METHOD AND APPARATUS FOR IMAGE ENCODING IN WHICH REFERENCE PIXELS FOR PREDICTIVE ENCODING CAN BE SELECTED BASED ON IMAGE SIZE

BACKGROUND OF THE INVENTION:

1. Field of the Invention

The present invention relates to a method and apparatus for encoding an image based on image communication and an image data base.

2. Description of the Related Art

In a facsimile apparatus (as a typical example of a conventional still image communication apparatus), an image is sequentially scanned in a raster direction, and the scanned data is encoded and transmitted. According to this scheme, in order to obtain the entire image, encoded data of the entire image must be transmitted, which results in a long transmission time. It is therefore difficult to apply this scheme to image data base services and image communication service such as video telex service.

In order to acquire and handle the entire image at high speed, hierarchical encoding can be proposed. FIG. 1 shows a conventional hierarchical encoding scheme. An image is reduced to ½ by subsampling in both main scanning and subscanning directions to obtain a ½-reduced image. The ½-reduced image is further reduced to obtain a ¼-reduced image. This operation is repeated to obtain sequentially lower-resolution images. Encoding is started from these low-resolution images, and the encoded images are sequentially transmitted, thereby allowing acquisition of the entire image at the receiving side at high speed. In the example of FIG. 1, an image is reduced to ½, ¼, and ⅛ in both the main scanning and subscanning directions, and encoding is performed in the order ⅛, ¼, ½, and 1 (one-to-one size image or original image). The encoded data are then transmitted also in the above order.

Referring to FIG. 1, frame memories (FM1, FM½, FM¼, and FM⅛) 101 to 104 store an original image, and ½-, ¼- and ⅛-reduced images, respectively.

Reduction units (RDs) 105 to 107 generate ½-, ¼- and ⅛-reduced images. Encoders 108 to 111 encode the ⅛-, ¼-, ½- and ⅛-reduced images and the original image, respectively. In encoding the ⅛-reduced image, the ⅛-reduced images stored in the frame memory 104 are sequentially scanned, and entropy coding such as arithmetic encoding is performed with reference to a noticed pixel (i.e., the pixel current in question) and neighboring pixels. For the ¼reduced image, encoding efficiency can be increased by referring to the neighboring pixels of the noticed pixel and the neighboring pixels of the ⅛-reduced image. Similarly, the ½-reduced image is encoded with reference to the ¼-reduced image, and the original image is encoded with reference to the ½-reduced image.

As is apparent from the prior art shown in FIG. 1, reduction is performed in the order ½, ¼, and ⅛. Encoding is performed in the order ⅛, ¼, ½, and 1, from the lower-resolution images. One frame memory is required for an image of each stage (reduction size). The number of reduction circuits must be the number of stages of the images.

In the prior art, therefore, the capacity of a memory for storing images of the respective stages is inevitably increased, and the reduction units for generating reduced images are required in units of stages, thus resulting in a bulky apparatus.

Conventional image encoding schemes include the MH scheme for encoding continuity (i.e., run length) of a monochromatic image, the MR scheme, and the MMR scheme. When a halftone image obtained by a dither method or an error diffusion method is encoded by using such an encoding scheme, the data volume of the encoded image is larger than that of the original image since the halftone image has short run lengths.

In recent years, an arithmetic encoding scheme (G. G. Langdon and J. J. Rissanen, "Compression of Black-White Images with Arithmetic Coding", IEEE Trans. Commun. COM-29, 1981) has received a great deal of attention. This scheme is known as a highly efficient encoding scheme whose encoding efficiency is determined by probability of occurrence, regardless of run lengths, of white and black runs.

In a conventionally known arithmetic encoding scheme, however, a probability of occurrence of minor symbols in an image to be encoded is required during encoding. For example, an image to be encoded is pre-scanned to obtain statistical data, and a probability of occurrence of minor symbols must be calculated in correspondence with each image.

In a conventional dynamic arithmetic encoding scheme which does not require prescanning, images to be input are sequentially monitored to obtain minor symbols. According to this scheme, however, a predetermined number of pixels are referred to regardless of the size of an image to be encoded. When the image is small, encoding efficiency is undesirably decreased.

More specifically, when the number of reference pixels is large for an image of a small size, the possibility of occurrence of each state is decreased. As a result, encoding is completed before an initial value is converged to an optimal value, thus degrading the encoding efficiency.

SUMMARY OF THE INVENTION

The present invention has been made in consideration of the above situation, and has as its object to provide a method and apparatus for encoding an image by highly efficient encoding in a simple arrangement.

It is another object of the present invention to provide a method and apparatus for encoding an image so as to perform encoding suitable for the size of an image to be encoded.

It is still another object of the present invention to provide a method and apparatus for encoding an image so as to optimize reference pixels in predictive coding.

It is still another object of the present invention to provide an apparatus for encoding a hierarchical image in a simple arrangement.

The above and other objects, features, and advantages of the present invention will be apparent from the following detailed description taken in conjunction with the accompanying drawings.

BRIEF DESCRIPTION OF THE DRAWINGS

FIG. 3 is a block diagram of an image reduction unit;

FIG. 4 is a table showing coefficients of a low-pass filter;

FIG. 5 is a view for explaining subsampling;

FIG. 7 is a flow chart for explaining encoding;

DETAILED DESCRIPTION OF THE PREFERRED EMBODIMENTS:

The preferred embodiments of the present invention will be described with reference to the accompanying drawings.

Figure 1:
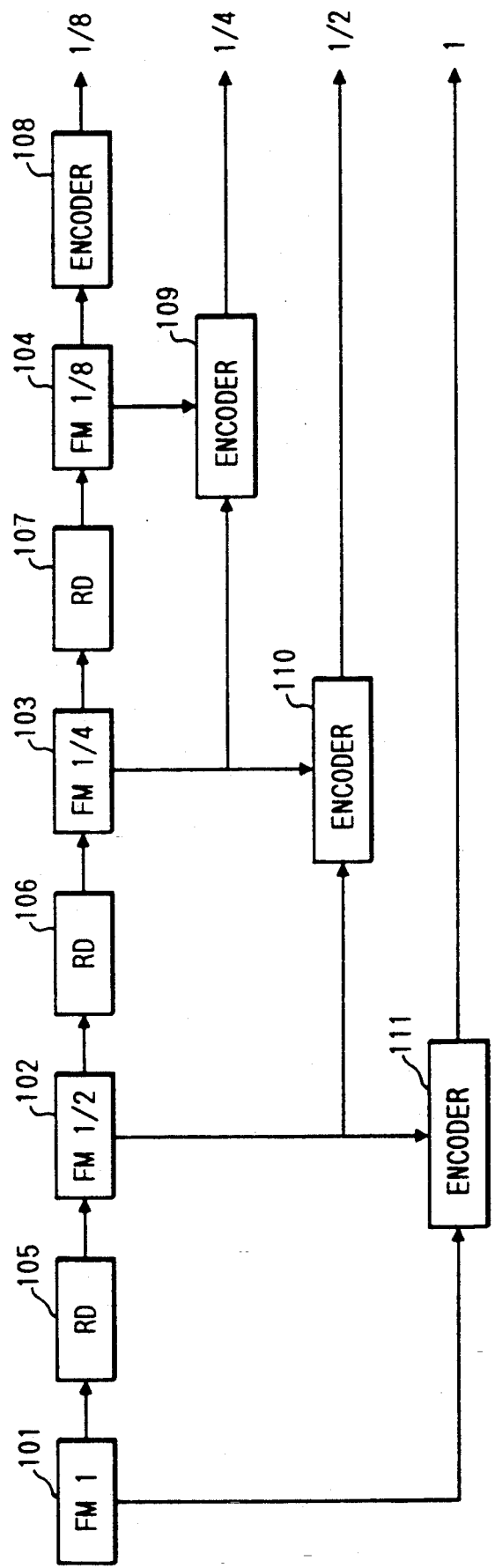
FIG. 1 is a block diagram showing a conventional arrangement.
Figure 2:
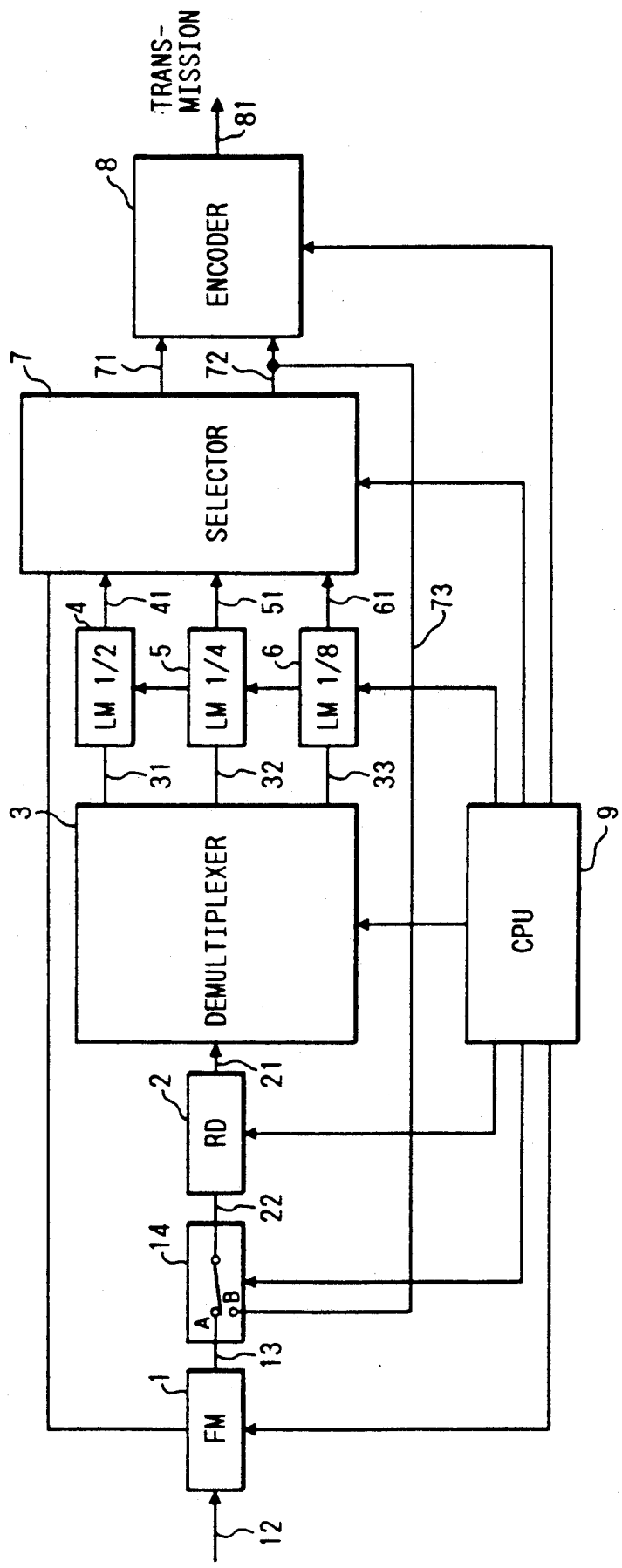
FIG. 2 is a block diagram showing an arrangement according to an embodiment of the present invention.

FIG. 2 shows an image encoding apparatus according to an embodiment of the present invention. This image encoding apparatus includes a frame memory 1 for storing one frame of an original image, an image reduction unit 2 for generating a reduced image, a demultiplexer 3 for distributing reduced images to line memories 4, 5, and 6 in units of rasters, a selector 7 for selecting two of data lines 11, 41, 51, and 61 and outputting the selected data to signal lines 71 and 72, and an encoder 8 for encoding each hierarchical image. The line memories 4, 5, and 6 store a few lines (three lines in this embodiment) of ½- ¼- and ⅛-reduced images, respectively.

One frame of an image (original image) to be encoded is input from an image input unit (not shown) to the frame memory 1 through a signal line 12. The original image is input from the frame memory 1 to the image reduction unit 2 through signal lines 13 and 22. At this time, a switch 14 is connected to the signal lines 13 and 22 (the A side in FIG. 2).

The image reduction unit 2 is arranged, as shown in FIG. 3. That is, the image reduction unit 2 comprises line memories 21, 22, and 23 each capable of storing three lines of an image, a 3×3 low-pass filter 24 for smoothing outputs from the line memories 21, 22, and 23, a comparator 25 for binarizing an output from the low-pass filter 24, and a subsampling unit 26 for extracting a binary output at a predetermined timing.

FIG. 4 shows coefficients of the 3×3 low-pass filter 24. The central pixel has a weighting coefficient C (C is a standard value, i.e., 4), and different weighting coefficients shown in FIG. 4 are assigned to the neighboring pixels. If the density of the central pixel is given as $D_{ij}$ (i=1 to M; j=1 to N where M and N are image sizes in the horizontal and vertical directions, respectively), an output density W of the filter is given as follows:

$$W = (D_{i-1,j-1} + 2D_{i,j-1} + D_{i+1,j-1} + 2D_{i-1,j} + CD_{ij} + 2D_{i+1,j} + D_{i-1,j+1} + 2D_{i,j+1} + D_{i+1,j+1})$$

The output W from the low-pass filter 24 is binarized with a threshold value T by the comparator 25 shown in FIG. 3. In this case, binary processing is performed as follows:

If $W > T$, then output signal=1
If $W < T$, then output signal=0

The size of the binary output is reduced to ½ by the subsampling unit 26 in the vertical and horizontal directions. FIG. 5 is a view for explaining subsampling. Image data indicated by hatched lines are extracted only for every other line in both the main scanning and the subscanning directions, and a subsampled image of ½ size (¼ area) is formed. This can be easily performed by controlling latch timings of the image data.

More specifically, as shown in FIG. 5, in order to reduce an image to ½ in the main scanning and subscanning directions, a three-line image a is filtered by the 3×3 low-pass filter, and a filter output is extracted at ½ rate, thereby subsampling a1, a2, a3, a4,.... A three-line image b in FIG. 5 is filtered by the 3×3 low-pass filter, and the low-pass filter output is extracted at ½ rate, thereby subsampling b1, b2, b3, b4,.... In this manner, the image on the same lines 1 can be commonly used to obtain the outputs a1, a2, a3, a4... and b1, b2, b3, b4....

As described above, the ½-reduced image data (binary data) is distributed to the line memories 4, 5, and 6 through the signal line 21 in FIG. 2. When an original image is reduced to a ½-image, the resultant ½-reduced image is stored in the line memory 4. When a ¼-reduced image is reduced to a ¼-image, the resultant ¼-reduced image is stored in the line memory 5. When a ⅛-reduced image is reduced to a ⅛-image, the resultant ⅛-reduced image is stored in the line memory 6.

As described above, each line memory has three memory sections for storing three lines of the corresponding hierarchical image.

A CPU 9 controls operations of the respective components in accordance with predetermined procedures.

The encoding procedures under the control of the CPU 9 will be described in detail with reference to a flow chart in FIG. 6.

Figures 6, 6A, 6B:
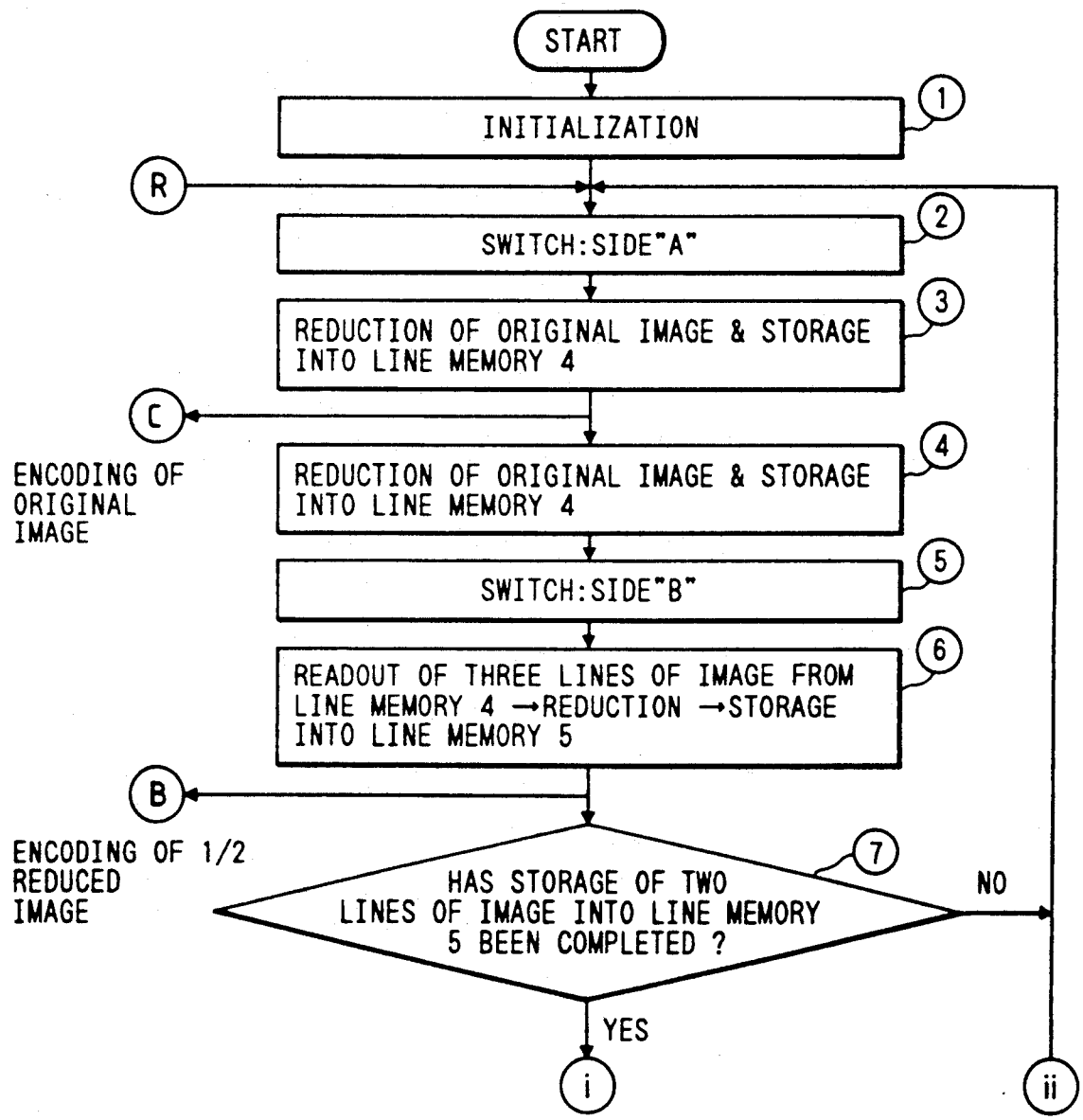
FIG. 6, consisting of FIGS. 6A and 6B, is a flow chart for explaining encoding.
Figure 6B:
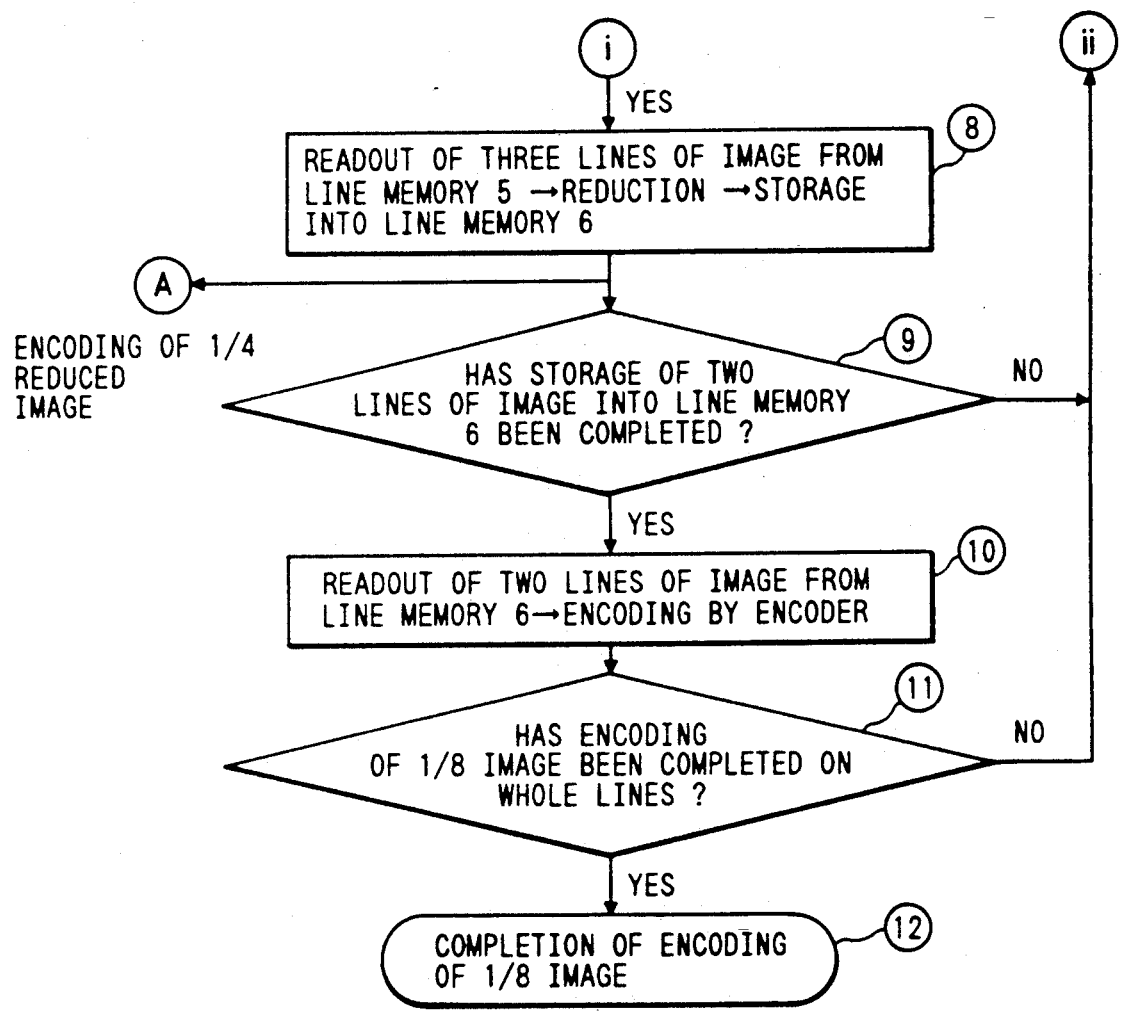

FIG. 6 is a flow chart for encoding a ½-reduced image. The encoding procedures will be described with numerals indicated on the right-hand side of FIG. 6.

① Initialization is performed. That is, the line memories 4, 5, and 6 are cleared, and the switch 14 is set on the A side.

② The switch 14 is set on the A side.

③ The original image is read out every line from the frame memory 1 to obtain a continuous three-line image. This three line image is reduced to ½ in the vertical and horizontal directions to form a one-line image. The one-line image is written in one of the three memory sections which first received the image data through the demultiplexer 3.

④ A one-line image obtained by reducing an original image to ½ is formed as in step ③ and is stored in the line memory 4. This image is written in one of the remaining two memory sections which received the image data earlier than the other. (This one-line image and the previous one-line image constitute a three-line ½-reduced image in the line memory 4).

⑤ The switch 14 is set on the B side.

⑥ Three lines of the ½-reduced image stored in the line memory 4 are sequentially supplied to the reducing unit 2 through the selector 7, a signal line 73, and a switch 15. The reduction unit 2 forms a one-line image (i.e., a ¼-reduced image) obtained by reducing the three-line image to ½ in the vertical and horizontal directions. The ¼-reduced image is stored in one of the three memory sections which first received the image data in the line memory 5 through the demultiplexer 3.

⑦ Steps ② to ⑥ are repeated until two lines of the ¼-reduced image are stored in the line memory 5 (this ¼-reduced image together with the previous reduced image constitute three lines of the ¼-reduced image in the line memory 5).

⑧ The three line ¼-reduced image data are read out and further reduced to ½ by the image reduction unit 2, thereby forming a ⅛-reduced image. This ⅛-reduced image is stored in one of the memory sections which first received the image in the line memory 6 through the demultiplexer 3.

⑨ Steps ② to ⑧ are repeated until several reference lines required for encoding (two lines in this embodiment) of the ⅛-reduced image are written in the line memory 6.

⑩ The two lines of the ⅛-reduced image stored in the line memory 6 are supplied to the encoder 8 through the selector 7 and teh signal line 71 and are sequentially encoded by the encoder 8. The encoder 8 sequentially encodes the input data with reference to the noticed pixel and its neighboring pixels by an encoding method to be described later.

⑪ Steps ② to ⑩ are repeated until encoding of all lines of the ⅛-reduced image is completed.

⑫ Encoding of the entire ⅛-reduced image is completed.

The above description has been made for encoding of the ⅛-reduced image. Encoding of ¼-and ½-reduced images and an original image will be described with reference to FIG. 7.

Encoding of the ¼-reduced image is started when a connector Ⓐ of the flow chart of FIG. 6 is shifted to a flow chart of FIG. 7. Encoding of the ½-reduced image is started when a connector Ⓑ of the flow chart of FIG. 6 is shifted to the flow chart of FIG. 7. Encoding of the original image is started when a connector Ⓒ of the flow chart of FIG. 6 is shifted to the flow chart of FIG. 7.

In any of these cases, a noticed pixel of an image to be encoded is centered, and the encoder 8 encodes the input data with reference to two lines of the image to be encoded and one line (the same line as that including the noticed pixel) of the ½-reduced image of the image to be encoded. An encoding method will be described later.

Encoding of the reduced images (½-and ¼-reduced images) and the original image will be commonly described with reference to FIG. 7 by using numerals written on the right-hand side in FIG. 7.

⑬ An image of a line including the noticed pixel of the image to be encoded and an image of the previous line are sequentially read out and supplied to the encoder 8 through the selector 7 and the signal line 71. The original image to be encoded is read out from the frame memory, whereas the ½- and ¼-reduced images to be encoded are read out from the line memories 41 and 51, respectively.

⑭ An image of one line (the same line as that including the noticed pixel to be encoded) of the ½-reduced image of the image to be encoded is read out from one of the memories 4, 5, and 6 and is supplied to the encoder 8 through the signal line 72.

⑮ The encoder 8 encodes the input data with reference to the two lines including the noticed pixel to be encoded and one line (the same line as that including the noticed pixel) of the reduced image.

⑯ Steps between the connector Ⓡ and step ⑯ are repeated to complete encoding of all pixels of the image to be encoded.

The above description has been made for the flows of encoding of the original image, the ½-reduced image, and the ¼-reduced image.

Encoding performed by the encoder 8 shown in FIG. 2 will be described below. Arithmetic encoding is used as an encoding scheme in this embodiment.

In this embodiment, a value of a noticed pixel is predicted from the neighboring pixels, a predicted pixel symbol is given as a major symbol, and other symbols are given as minor symbols. A probability of occurrence of the minor symbols is given as p, and encoding is performed on the basis of this probability.

If binary arithmetic codes and auxiliary amounts for a code series s are defined as C(s) and A(s), respectively, they are given as:

$$A(sl) = A(s) \cdot P(s) = A(s) \cdot 2^{-Q(s)}$$

$$A(sO) = A(s) - A(sl)$$

$$C(sl) = C(s) + A(sO)$$

$$C(sO) = C(s) \qquad (1)$$

for A(null)=0.11...1

Encoding is performed by the above arithmetic calculations. $p(s) = 2^{-Q(s)}$ is approximated to perform multiplications by only binary shifting. In the above equations, Q is called as a skew value. Major and minor symbols used for prediction, and the skew value Q must be predetermined for all reference pixels from a reference image.

Decoding is based on a binary signal train s=s'xs". When decoding is completed up to s', C(s) is compared with C(s')+A(s'O). If C(s) > (C(s')+S(s'O), then x=1. Otherwise, x=O.

Figures 8, 9, 14:
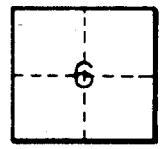
FIG. 8 is a view for explaining the relation between a noticed pixel to be encoded and its neighboring pixels.
FIG. 9 is a view for explaining a reduced pixel.
FIG. 14 is a view showing reference pixel positions.

FIG. 8 shows neighboring reference pixels 1 to 5 of a noticed pixel (*) to be encoded in this embodiment. The noticed pixel is predicted in accordance with states of these reference pixels. FIG. 9 shows pixel 6 obtained at the same position by reducing the pixels including the noticed pixel to ½. In encoding of the ⅛ reduced image, the noticed pixel is predicted by the five neighboring pixels (1 to 5), and encoding is performed by the arithmetic calculations described above. In encoding of the original image, the ½-reduced image, and the ¼-reduced image, the noticed pixels are predicted by the neighboring pixels (1 to 5 in FIG. 8) of the noticed pixel to be encoded, the pixel (6 in FIG. 9) located at the same position as the noticed pixel to be encoded, and the positional relationship (four states determined by the positions of the noticed pixel in the dotted areas in FIG. 9) between the noticed pixel and the reduced pixel. Thereafter, encoding is performed by the arithmetic calculations described above.

Figure 10:
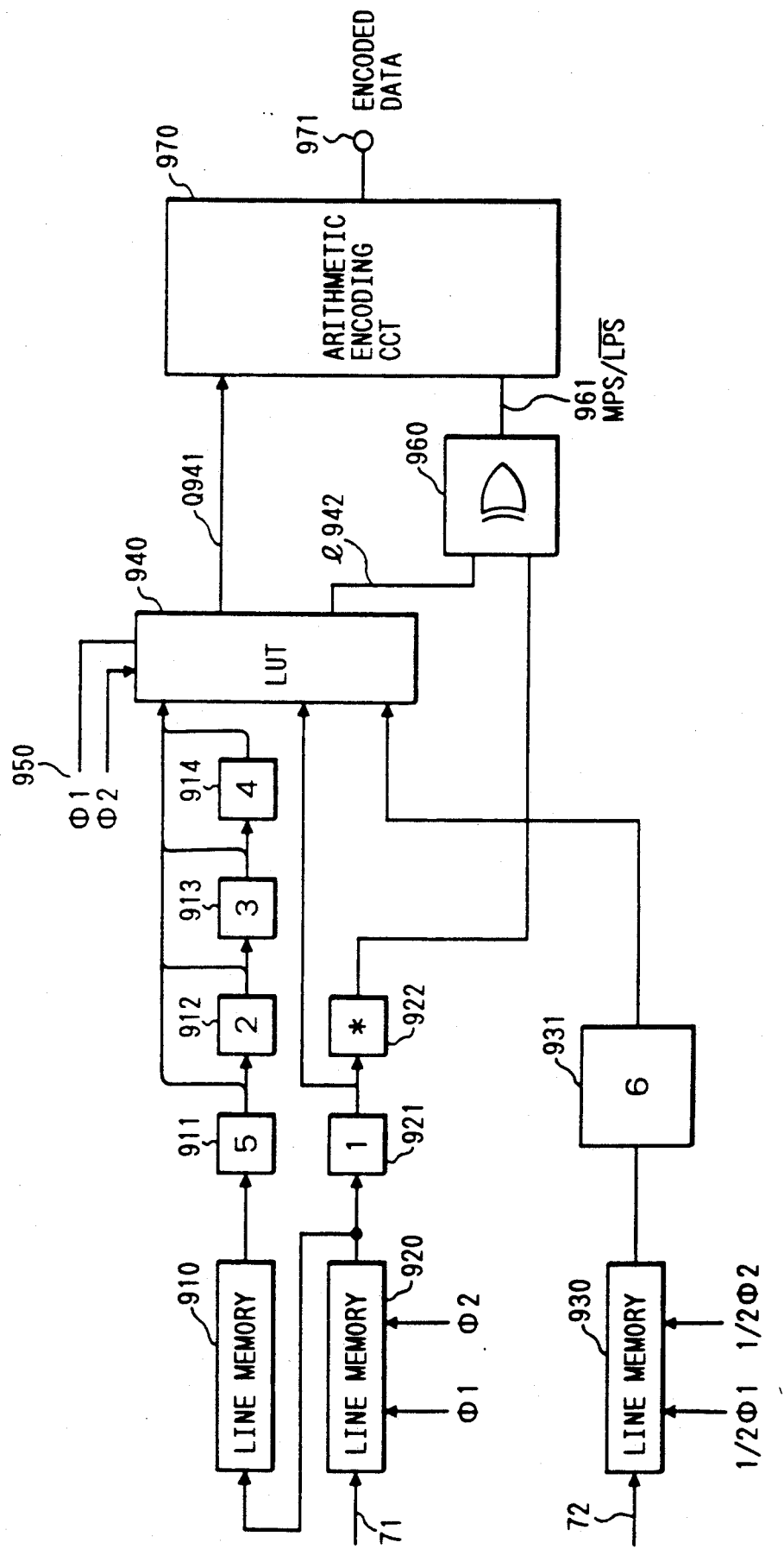
FIG. 10 is a block diagram of an encoder.

FIG. 10 shows a noticed pixel predicting circuit and an arithmetic encoding circuit. Line memories 910 and 920 store two-line images including the noticed pixel. A line memory 930 stores a one-line image obtained by reducing the image to be encoded. Signal lines 71 and 72 are the same as those in FIG. 2.

A pixel clock $\phi 1$ is a raster clock, and a clock $\phi 2$ is a line clock. Latches 911, 912, 913, 914, 921, and 922 store neighboring pixels of a noticed pixel, and the noticed pixel, respectively. The reference numerals and symbols as in FIG. 7 denote the same parts in FIG. 10. Clocks ½φ1 and ½φ2 are raster and line clocks of the reduced image, respectively, and have ½ the clock speed of the clocks φ1 and φ2. A latch 931 stores a reduced pixel (FIG. 9) located at the same position as that of the noticed pixel. The numeral in the latch 931 corresponds to the numeral in FIG. 9.

A look-up table (LUT) 940 trains a reference image or the like to store a skew value Q941 and a minor symbol 1 942 in each neighboring pixel state. Data of the latches 911, 912, 913, 914, and 921 for storing the neighboring pixels and data from the latch 931 for storing the reduced image are input to the LUT 940. Since the positional relationship between the reduced pixel and the noticed pixel is determined by two bits, i.e., the clocks φ1 and φ2, this two-bit data is also input to the LUT 940. The LUT 940 outputs to an arithmetic encoding circuit 970 skew values Q941 and the minor symbols( 942 which correspond to a plurality of neighboring pixel states defined by combinations of a plurality of inputs.

In the case of the ½-reduced image, since a further reduced image (i.e., a 1/16-reduced image) is not present, the content of the latch 931 is set to be always zero. The LPS signal( 942 from the LUT 940 and the noticed pixel 922 are exclusively ORed by an exclusive OR gate 960 to obtain an MPS/$\overline{LPS}$ signal 961. The signal 961 represents that the major pixel is a major symbol when it is set at "1". However, when the signal 961 is set at "0", it represents a minor symbol. The arithmetic encoding circuit 970 performs the arithmetic operations given by equation (1) using the skew values Q941 and the MPS/$\overline{LPS}$ signals 961.

In this embodiment, the low-pass filter and subsampling are used to generate a reduced image. However, even if another reducing scheme is used, a similar arrangement can be used. Arithmetic encoding is used as an encoding scheme. However, a Markov code may be used in place of a Huffman code or the like to obtain the same effect as described above.

As described above, reducing processing in hierarchical encoding can be commonly used for all stages, and the apparatus can be made compact. In addition, hierarchical encoding can be performed by using only line buffers each having a capacity of a few lines as hierarchical image memories.

In the encoder 8 shown in FIG. 2, the pixels 1 to 5 at positions shown in FIG. 8 are always used as encoding reference pixels. Encoding efficiency can be improved when reference pixel positions and the number of reference pixels are changed in accordance with an image size as in an embodiment described below.

Pixels necessary as the reference pixels are extracted from an image included in a line including a noticed pixel and two previous lines thereof.

Figure 11:
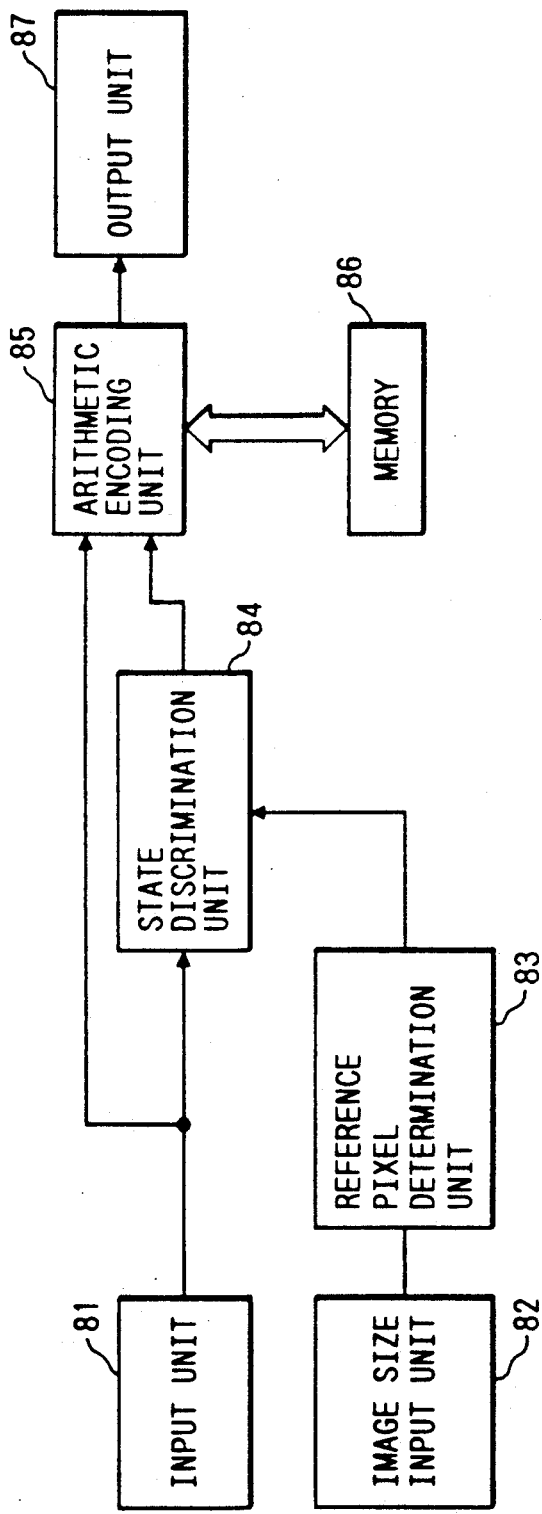
FIG. 11 is a block diagram showing an arrangement according to another embodiment of the present invention.

FIG. 11 is a block diagram of an image processing apparatus according to another embodiment of the present invention.

In the image processing apparatus, an input unit 81 receives image data from a reader having an image sensor such as a CCD to photoelectrically read an original image. An image size input unit 82 receives a size (data volume) of an image on the basis of an operation of a size input key or an output from a size detection sensor. A reference pixel determination unit 83 determines the number of reference pixels by an image size value input from the image size input unit 82. A state discrimination unit 84 discriminates a state of an input image when the input image is assumed to be a Markov model. An arithmetic encoding unit 85 performs arithmetic encoding of image data. A memory 86 stores discrimination state data and encoded data. An output unit 87 outputs encoded data.

Figure 12:
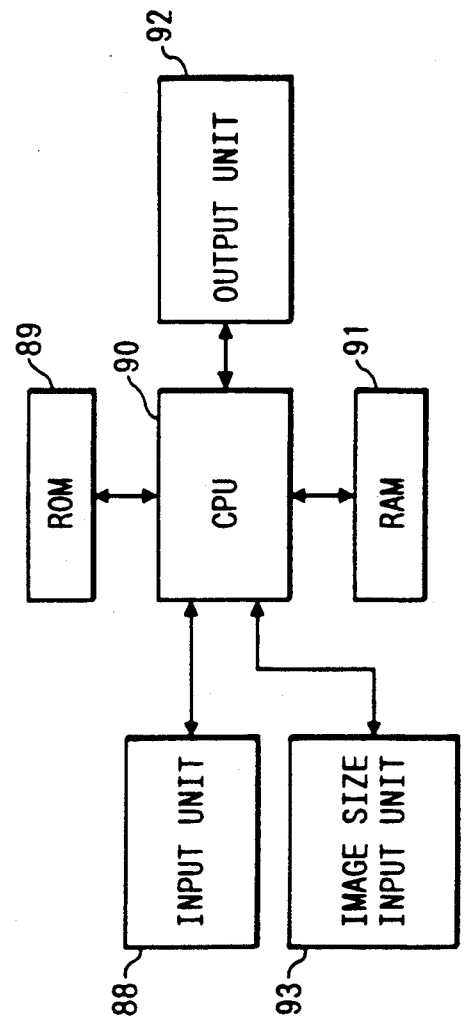
FIG. 12 is a block diagram of an arrangement using a microprocessor according to the present invention.

FIG. 12 shows an arrangement wherein the reference pixel determination unit 83, the state discrimination unit 84, and the arithmetic encoding circuit 85 in FIG. 11 are realized by a microprocessor.

An input unit 88 corresponds to the input unit 81 shown in FIG. 11. A ROM 89 stores an encoding program for image data. A CPU 90 includes a microprocessor as its major component and processes signals from the input unit 88 in accordance with the program stored in the ROM 89. A RAM 91 stores data processed by the CPU 90. An output unit 92 corresponds to the output unit 87 (FIG. 11) for outputting the data processed by the CPU 92 as encoded data. An input unit 93 corresponds to the input unit 82 shown in FIG. 11. Processing performed by the reference pixel determination unit 83, the state discrimination unit 84, and the arithmetic encoding unit 85 in FIG. 11 is performed by the CPU 90.

Figure 13:
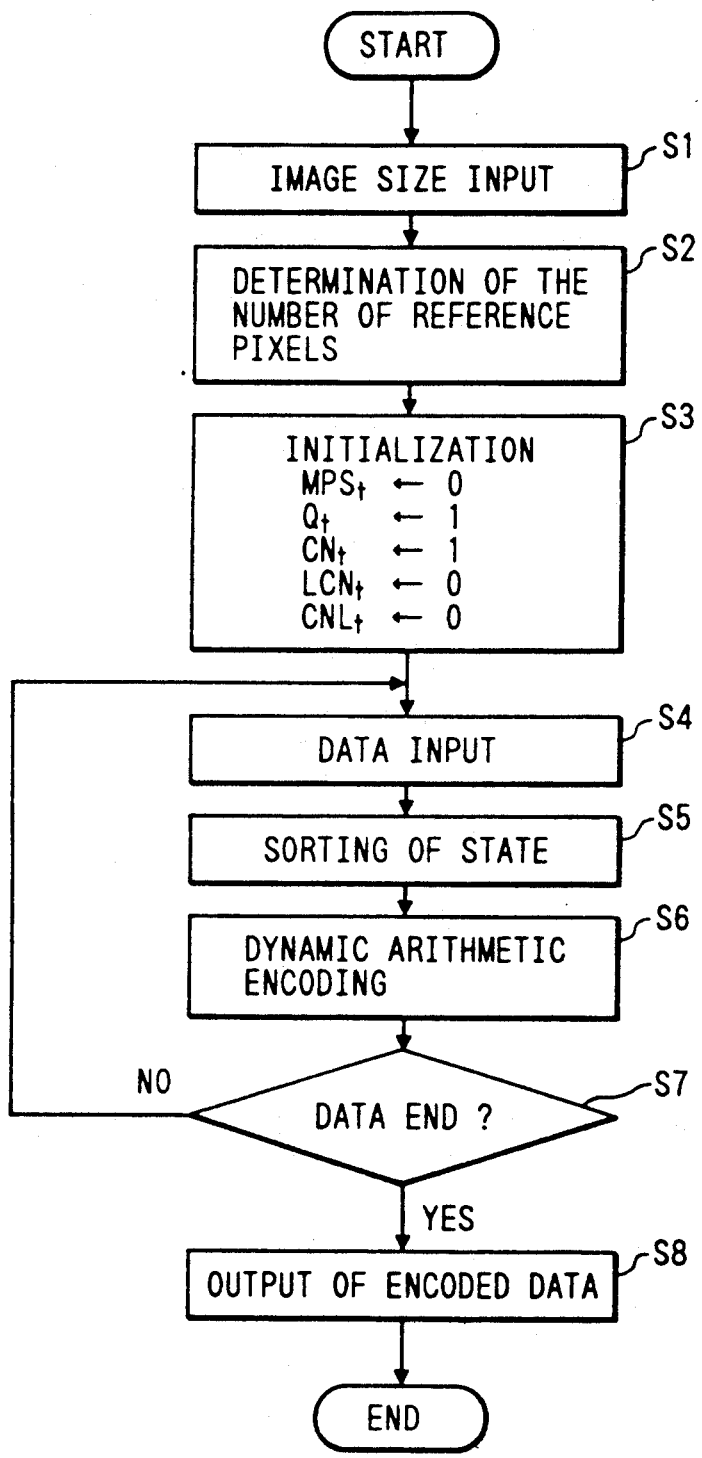
FIG. 13 is a flow chart for explaining an operation of the embodiment shown in FIG. 12.

FIG. 13 is a flow chart showing a control sequence of the CPU 90 shown in FIG. 12.

When the program starts to run, data representing a size of an image to be encoded is input from the input unit 93 in step S1. The CPU 90 determines the number of reference pixels as in Table 1 in response to the input image size (the number of pixels) in step S2. For example, when the number of all pixels is 100,000, the number of reference pixels is seven. In this case, pixels numbered as 1 to 7 shown in FIG. 14 are referred to. The noticed pixel is represented by *.

TABLE 1

| Image Size (Number of All Pixels) | Number of Reference Pixels |
|---|---|
| 64152 or less | 4 pixels |
| 64153–256608 | 7 pixels |
| 256609–1026432 | 12 pixels |
| 1026433–4105728 | 16 pixels |

In step S3, the major symbol (MPS) and the skew value (Q) of arithmetic encoding, a two-pixel counter CN, a minor symbol counter LCN, and a major interval counter CNL are initialized. For example, if seven pixels serve as reference pixels, the number of combinations of states of the seven pixels is $2^7$. Each of the number of major symbols and the number of skew values is $2^7$ corresponding to the states. The $2^7$ major symbols, the $2^7$ skew values, the two-pixel counter, the minor symbol counter, and the major interval counter are defined as MPSt, Qt, CNt, LCNt, and CNLt (t=0, 1,... 127), respectively.

In step S4, image data is input from the input unit 88. In step S5, the states are classified into 128 (=$2^7$) states with reference to the reference pixels already determined for a noticed pixel x(i,j). A method of classifying the states is performed on the basis of an assumption that a value of a dotted pixel value is given as 1, and a value of a nondotted pixel value is given as 0. A state St of the noticed pixel x(i,j) is represented by the following value:

$$S_t = x(i - 1,j) + 2^1 \cdot x(i,j - 1) + 2^2 \cdot x(i + 1,j - 1) +$$
$$2^3 \cdot x(i - 1,j - 1) + 2^4 \cdot x(i - 2,j - 1) +$$

-continued
$$2^5 \cdot x(i-1, j-2) + 2^6 \cdot x(i+1, j-2)$$

Similarly, if the number of reference pixels is 16, the following equation can be obtained:

$$St = x(i-1, j) + 2 \cdot x(i, j-1) + ... + 2^{15} \cdot x(i-3, j-1)$$

In step S6, the noticed pixel is arithmetically encoded using the data MPSt and Qt corresponding to the classified states, and the encoded data are stored in the RAM 91. If the data MPSt and Qt must be renewed, these values are renewed. In this manner, the input pixel data are sequentially encoded.

The CPU 90 determines in step S7 that all image data (e.g., one-frame image data) are encoded. If NO in step S7, the next pixel is input to repeat the state classification and arithmetic encoding. If YES in step S7, the encoded data stored in the RAM 91 are output to the output unit 92, thereby completing the processing. At this time, if the data representing the number of reference pixels and the reference pixel positions are added as header data, the encoded data can be uniquely decoded.

Figure 15:
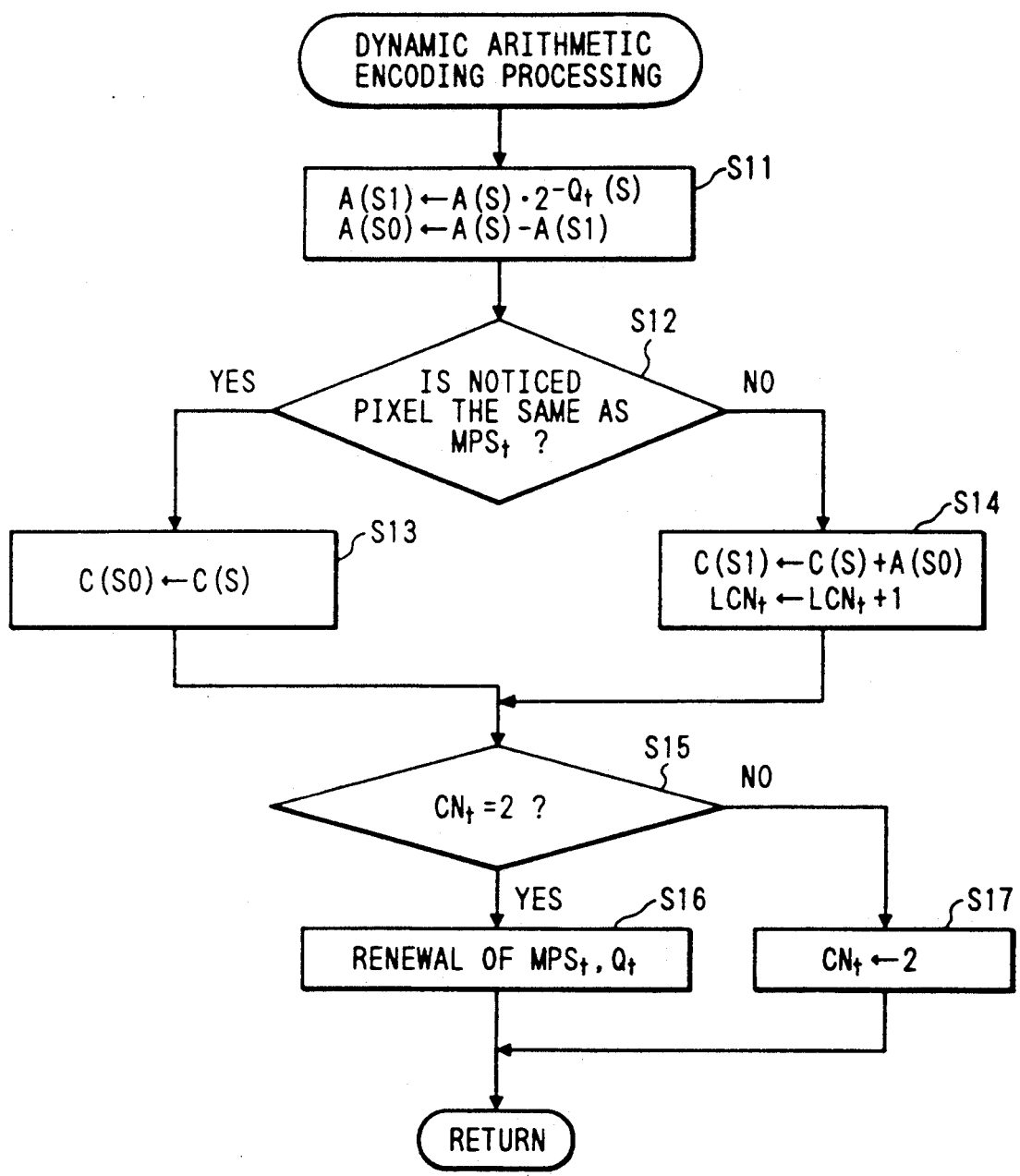
FIG. 15 is a flow chart for explaining dynamic arithmetic encoding processing.

FIG. 15 is a detailed flow chart of a dynamic arithmetic encoding operation in step S6 of FIG. 13. In this embodiment, as described above, the value of the noticed pixel is predicted from the neighboring pixels determined in accordance with the image size. The predicted pixel symbol is given as the major symbol MPSt, and other symbols are defined as minor symbols. At the same time, the probability of occurrence of the minor symbols is given as Pt, and encoding is performed on the basis of this data.

More specifically, if the binary arithmetic code and an auxiliary amount for a code series S are given as C(S) and A(S), respectively, $$A(S1) = A(S) \cdot P(S) = A(S) \cdot 2^{-Q(s)}$$

$$A(S0) = A(S) - A(S1) \quad (A)$$

According to whether the noticed pixel is a major symbol, $$C(S1) = C(S) + A(S0)$$

$$C(S0) = C(S) \quad (B)$$

For A(null) = 0, 11...1.

As described above, encoding is performed by arithmetic calculations. $P(S) = 2^{-Q(s)}$ is approximated to perform multiplications by only binary shifting. The parameter Q is called a skew value. When this parameter is changed in accordance with states of reference pixels, arithmetic encoding can be dynamic.

In step S11, equations (A) are set. The CPU 90 determines in step S12 whether the noticed pixel determined by the reference pixels has the same value as that of the major symbol MPSt. If YES in step S12, C(S0)←C(S) is performed in step S13. If NO in step S12, i.e., when the noticed pixel is determined to represent a minor symbol, C(S1)←C(S)+A(S0) is performed. In this case, the minor symbol counter LCNt is decremented by only one.

The CPU 90 determines in step S15 whether the count of the two-pixel counter CNt corresponding to the current pixel state is 2. If YES in step S15, MPSt and Qt corresponding to this pixel state are renewed in step S16. If CNt is 1, it is renewed to 2. Therefore, the skew value Qt and the major symbol MPSt corresponding to the pixel state t are dynamically updated on the basis of the previously encoded data every time the same pixel state is generated twice.

Decoding of the encoded data is based on a binary signal train $S = S + \times S''$. When decoding is completed up to S', C(S) is compared with C(S')+A(S'0). If C(S) > C(S'), then x=1. Otherwise, x=0.

Figure 16:
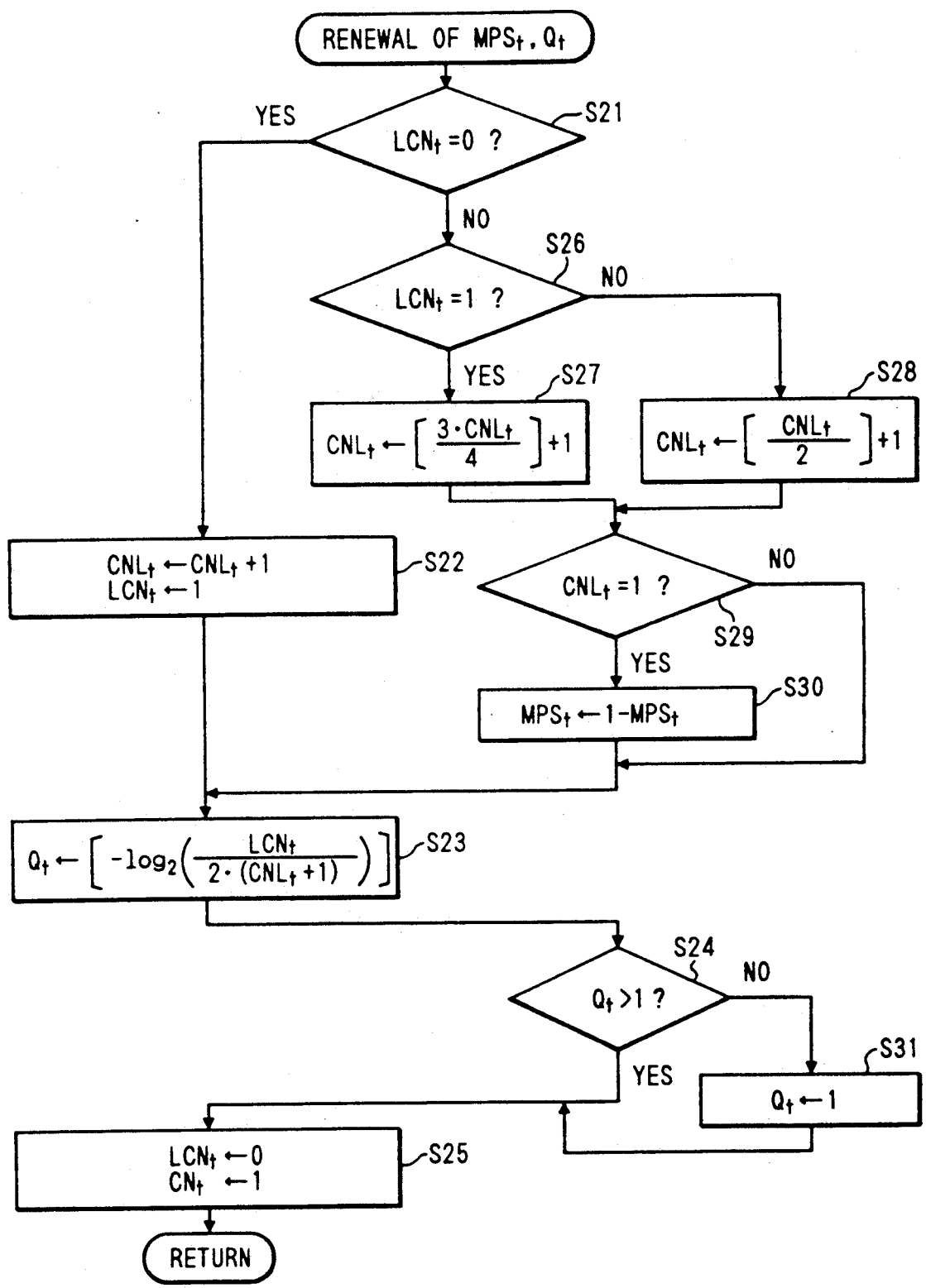
FIG. 16 is a flow chart for renewing major symbol skew values.

FIG. 16 is a detailed flow chart of renewal processing of MPSt and Qt in step S16 of FIG. 15. In step S21, when the same pixel state is generated twice and generation of a pixel corresponding to the minor symbol is zero times, the major interval counter CNLt representing the number of times of occurrence of only the major symbols is incremented by one in step S22. One is substituted into the minor symbol counter LCNt for subsequent calculations. If the number of times of occurrence of the minor symbol is one or two, the flow advances from step S26 to steps S27 and S28 to perform calculations CNLt←[3·CNLT/4]+1 and CNLt←[CNLt/2]+1 where symbol [] is a Gaussian symbol and represents a maximum integer equal to or smaller than the numeric value within the Gaussian symbol. The calculation results are substituted in the counter CNLt.

The CPU 90 determines in step S29 whether the CNLt is one. If YES in step S29, this indicates a boundary beyond which a probability of generating a minor symbol is higher than a probability of generating a major symbol in this pixel state t. In step S30, therefore, the MPSt corresponding to this pixel state t is inverted (i.e., if the state is "1", then it is inverted into "0"; and vice versa).

In step S23, a calculation [−log$_2${LCNt/(2·(CNLt +1))}] is performed using LCNt and CNLt to obtain a probability of occurrence of minor symbols in this pixel state. The resultant probability is substituted into Qt. When Qt exceeds one in steps S24 and S31, Qt is renewed to one. In step S25, the minor symbol counter LCNt is returned to zero, and the two-pixel counter CNt is reset to one.

When dynamic encoding is performed as described above, a considerable number of symbols are required to converge the value of Qt. In this case, the number of reference pixels is determined in accordance with an image size, and therefore, the number of symbols classified into one state can be sufficiently increased, thereby improving encoding efficiency.

As a method of performing dynamic encoding at high speed, the calculation (step S23 of FIG. 6) given as follows:

$$[-\log_2\{LCNt/(2 \cdot (CNLt+1))\}]$$

is performed in advance, and the calculation results are stored in the form of a table, thereby easily obtaining a hardware arrangement.

TABLE 2

| CNLt | LCNt | |
|------|---|---|
|      | 1 | 2 |
| 0 | 1 | 1 |
| 1 | 2 | 1 |
| 2 | 2 | 1 |
| 3 | 3 | 2 |
| 4 | 3 | 2 |
| 5 | 3 | 2 |
| . | . | . |

TABLE 2-continued

| CNLt | LCNt | |
|---|---|---|
| | 1 | 2 |
| . | . | . |
| . | . | . |
| . | . | . |

The present invention is applicable not only to image data read by a reader but also to output data such as an image data base. In this case, since the image size is often included in the header data, the header data can be used for an image size input.

In addition, when binary image attributes (e.g., data which discriminates a halftone image from a character image) are input, and pixel positions and the numbers of pixels which correspond to the respective attributes are referred to, encoding efficiency is improved.

As described above, the reference pixel positions and the number of reference pixels are changed in accordance with different image sizes, and the number of symbols assigned to the respective states can be sufficiently increased. Therefore, the skew values Q can be satisfactorily converged in the respective states, and encoding efficiency can be improved.

The present invention has been described with reference to the preferred embodiments. However, the present invention is not limited to these embodiments. Various changes and modifications may be made within the scope of the appended claims.

What is claimed is:

1. A method of encoding an image, comprising the steps of:
    inputting a size of a whole image to be encoded;
    determining reference pixel positions or the number of reference pixels in accordance with the input image size;
    predicting a status of a noticed pixel by using reference pixels of the determined pixel positions or the determined number; and
    encoding the noticed pixel by means of comprising an actual status of the noticed pixel with the predicted status of the noticed pixel.

2. A method according to claim 1, wherein the step of encoding the noticed pixel comprises the step of setting encoding parameters in accordance with states of the reference pixels.

3. A method according to claim 1, wherein the step of predicting the status comprises the step of predicting a symbol of the noticed pixel.

4. A method according to claim 1, wherein the step of encoding the noticed pixel comprises the step of encoding the noticed pixel by arithmetic encoding.

5. A method according to claim 1, wherein the step of inputting the image size comprises the step of detecting the size of the whole image.

6. An apparatus for encoding an image, comprising:
    means for inputting a size of a whole image to be encoded;
    means for determining reference pixel positions or the number of reference pixels in accordance with the size of a whole image input from said inputting means;
    means for predicting a status of a noticed pixel by using reference pixels of the pixel positions or the number which is determined by said determining means; and
    means for encoding the noticed pixel by means of comparing an actual status of the noticed pixel with the predicted status of the noticed pixel by said predicting means.

7. An apparatus according to claim 6, wherein said encoding means comprises means for setting encoding parameters in accordance with states of the reference pixels.

8. An apparatus according to claim 6, wherein said predicting means predicts a symbol of the noticed pixel.

9. An apparatus according to claim 6, wherein said encoding means encodes the noticed pixel by arithmetic encoding.

10. An apparatus according to claim 6, wherein said inputting means comprises means for detecting the image size.

11. An apparatus for encoding an image, comprising:
    means for entering an image to be encoded;
    means for forming one line of a reduced image on the basis of plural lines of image;
    means for storing plural lines of the reduced image formed by said forming means;
    means for selecting either one of the image entered from said entering means or the reduced image read out from said storing means, and supplying the selected image to said forming means;
    means for encoding the reduced image from said forming means; and
    means for controlling the image encoding operation, said controlling means repeatedly executing steps (A) to (D) set forth below:
    (A) causing said selecting means to select the image entered from said entering means;
    (B) causing said forming means to sequentially form a line of reduced image of a first stage on the basis of, the plural lines of image entered from said entering means;
    (C) causing said selecting means to select the reduced image of the first stage read out from said storing means, when said storing means has stored the plural lines of reduced image of the first stage which is needed for forming a line of reduced image of a second stage; and
    (D) causing said forming means to form a line of reduced image of the second stage on the basis of the plural lines of reduced image of the first state.

12. An apparatus according to claim 11, wherein said forming means forms a reduced image obtained by reducing an input image into ½.

13. An apparatus according to claim 11, wherein said encoding means performs encoding by arithmetic encoding.

14. An apparatus according to claim 11, wherein said forming means forms a line of reduced image, upon providing a filtering process for the plural lines of image.

15. An apparatus according to claim 11, wherein said controlling means repeatedly executes said steps (A) to (D) until the reduced image of the second stage of the whole image entered from said input means has been formed.

16. A method for encoding an image, comprising the steps of:
    inputting an attribute of an image to be encoded;
    determining reference pixel positions or the number of reference pixels in accordance with the input image attribute;
    predicting a status of a noticed pixel by using reference pixels of the determined pixel positions or the determined number; and encoding the noticed pixel by means of comparing an actual status of the noticed pixel with the predicted status of the noticed pixel.

17. A method according to claim 16, wherein said step of encoding the noticed pixel comprises the step of setting encoding parameters in accordance with states of the reference pixels.

18. A method according to claim 16, wherein said step of predicting the status comprises the step of predicting a symbol of the noticed pixel.

19. A method according to claim 16, wherein said step of encoding the noticed pixel comprises the step of encoding the noticed pixel by arithmetic encoding.

20. A method according to claim 16, wherein said step of inputting the image attribute comprises the step of inputting a size of a whole image to be encoded.

21. An apparatus for encoding an image, comprising:
means for inputting an attribute of an image to be encoded;
means for determining reference pixel positions or the number of reference pixels in accordance with the attribute of an image input from said inputting means;
means for predicting a status of a noticed pixel by using reference pixels of the pixel positions or the number which is determined by said determining means; and
means for encoding the noticed pixel by means of comparing an actual status of the noticed pixel with the predicted status of the noticed pixel by said predicting means.

22. An apparatus according to claim 21, wherein said encoding means comprises means for setting encoding parameters in accordance with states of the reference pixels.

23. An apparatus according to claim 21, wherein said predicting means predicts a symbol of the noticed pixel.

24. An apparatus according to claim 21, wherein said encoding means encodes the noticed pixel by arithmetic encoding.

25. An apparatus according to claim 21, wherein said inputting means inputs a size of a whole image to be encoded.

* * * * *

UNITED STATES PATENT AND TRADEMARK OFFICE
CERTIFICATE OF CORRECTION

PATENT NO. : 5,086,487

DATED : February 4, 1992

INVENTOR(S) : AKIHIRO KATAYAMA, ET AL.

It is certified that error appears in the above-identified patent and that said Letters Patent is hereby corrected as shown below:

On Title page, item [22]

"Nov. 2, 1989" should read --Nov. 20, 1989--.

COLUMN 1

Line 21, "service" should read --services--.
Line 40, "transmitted" should read --transmitted,--.
Line 43, "½-¼-" should read --½-, ¼-,--.
Line 44, "½-¼-" should read --½-, ¼-,--.
Line 45, "⅛-¼-" should read --⅛-, ¼-,--.
Line 51, "current" should read --currently--.
Line 52, "¼reduced" should read --¼- reduced--.

COLUMN 3

Line 46, "arranged," should read --arranged--.

COLUMN 5

Line 10, "to" should read --by--.
Line 21, "teh" should read --the--.
Line 31, "¼-and" should read --¼- and--.
Line 48, "½-and" should read --½- and--.

COLUMN 6

Line 31, "as" should be deleted.
Line 37, "C(s)>(C(s')+S(s'0)," should read
--C(s)>C(s')+S(s'0),--.

UNITED STATES PATENT AND TRADEMARK OFFICE
CERTIFICATE OF CORRECTION

PATENT NO. : 5,086,487

DATED : February 4, 1992

INVENTOR(S) : AKIHIRO KATAYAMA, ET AL.

It is certified that error appears in the above-identified patent and that said Letters Patent is hereby corrected as shown below:

COLUMN 6

Line 44, "⅛ reduced" should read --⅛-reduced--.

COLUMN 7

Line 18, "bols(942" should read --bols $\ell$ 942--.
Line 24, "signal(942" should read --signal $\ell$ 942--.

COLUMN 8

Line 17, "CPU 92" should read --CPU 90-- and "input" should read --image size input--.

COLUMN 10

Line 21, "symbol []" should read --symbol []--.

COLUMN 11

Line 40, "comprising" should read --comparing--.

UNITED STATES PATENT AND TRADEMARK OFFICE
CERTIFICATE OF CORRECTION

PATENT NO. : 5,086,487

DATED : February 4, 1992

INVENTOR(S) : AKIHIRO KATAYAMA, ET AL.

It is certified that error appears in the above-identified patent and that said Letters Patent is hereby corrected as shown below:

COLUMN 12

Line 34, "of," should read --of--.
Line 44, "first state." should read --first stage.--

Signed and Sealed this

First Day of June, 1993

Attest:

MICHAEL K. KIRK

*Attesting Officer*   Acting Commissioner of Patents and Trademarks